United States Patent [19]
Kneusel

[11] 3,880,187
[45] Apr. 29, 1975

[54] PLUG RELIEF VALVE FOR PRESSURE CONTAINERS

[75] Inventor: Raymond H. P. Kneusel, Flourtown, Pa.

[73] Assignee: Crown Cork & Seal Company, Inc., Philadelphia, Pa.

[22] Filed: May 17, 1971

[21] Appl. No.: 143,893

[52] U.S. Cl. ............ 137/525; 222/397; 137/DIG. 4
[51] Int. Cl. ............................................. F16k 15/14
[58] Field of Search...... 137/525, DIG. 4; 220/44 R, 220/44 D, 89 A, DIG. 27; 222/396, 397

[56] References Cited
UNITED STATES PATENTS

| | | | |
|---|---|---|---|
| 2,224,296 | 10/1940 | Hoffman | 220/44 R |
| 2,638,263 | 5/1953 | Jesnig | 137/525 X |
| 2,670,755 | 3/1954 | Kendrick | 137/467 |
| 2,702,046 | 2/1955 | Zimmer et al. | 137/467 |
| 2,761,593 | 9/1956 | Spiess et al. | 137/525 X |
| 3,365,105 | 1/1968 | Krizka | 137/525 X |
| 3,405,838 | 10/1968 | Preisendanz | 222/397 X |
| 3,454,182 | 7/1969 | Morton | 137/525 X |

FOREIGN PATENTS OR APPLICATIONS

| | | | |
|---|---|---|---|
| 1,502,899 | 10/1967 | France | 220/44 R |

Primary Examiner—Henry T. Klinksiek
Attorney, Agent, or Firm—Woodcock, Washburn, Kurtz & Mackiewicz

[57] ABSTRACT

A safety relief valve comprising a plug inserted into an aperture in the bottom of a pressure container. The plug which remains in the aperture allows the contents to escape at a controlled rate when a predetermined pressure is reached. In a first embodiment, the plug is force-fitted in the container aperture. As pressure builds up, the plug is forced outwardly to a second position where the contents can vent through an orifice at a controlled rate. In a second embodiment, when pressure overcomes the resistance of a spring, the contents may escape through an orifice which is forced to a location where it communicates with the atmosphere outside of the container.

8 Claims, 8 Drawing Figures

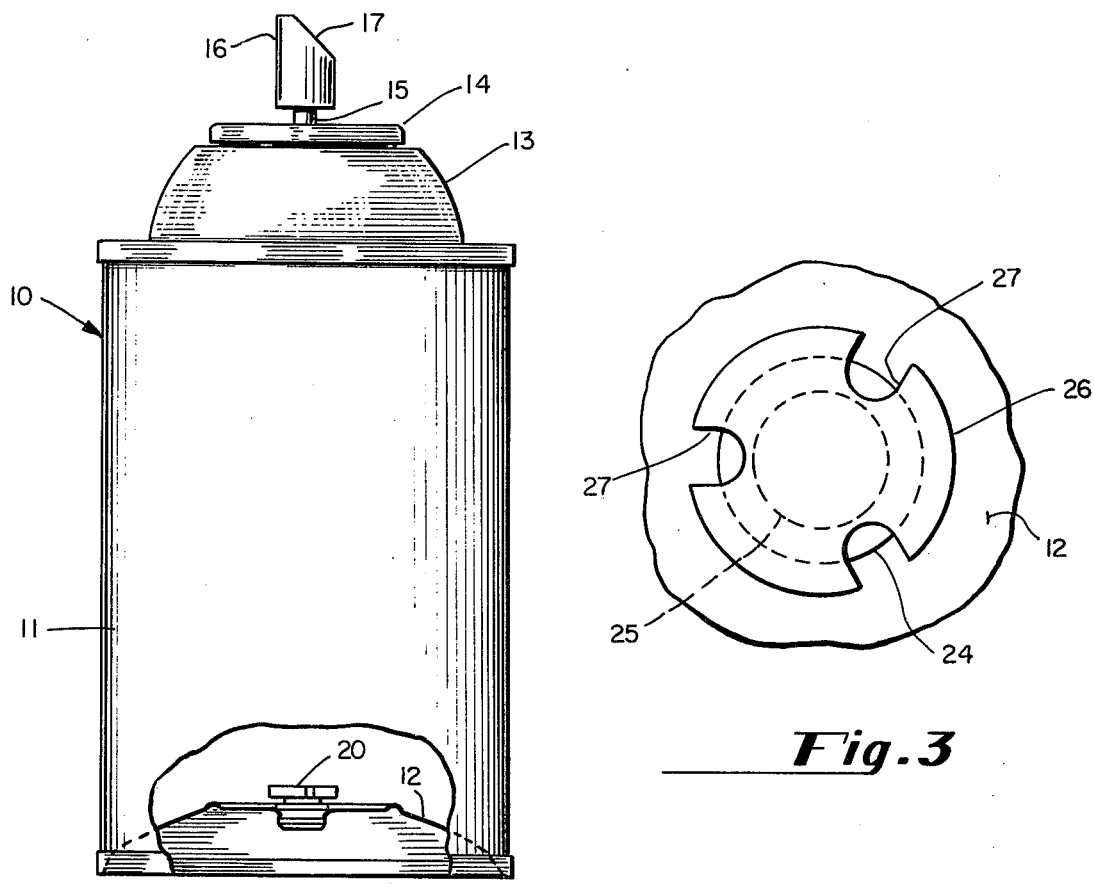
Fig. 1
Fig. 3
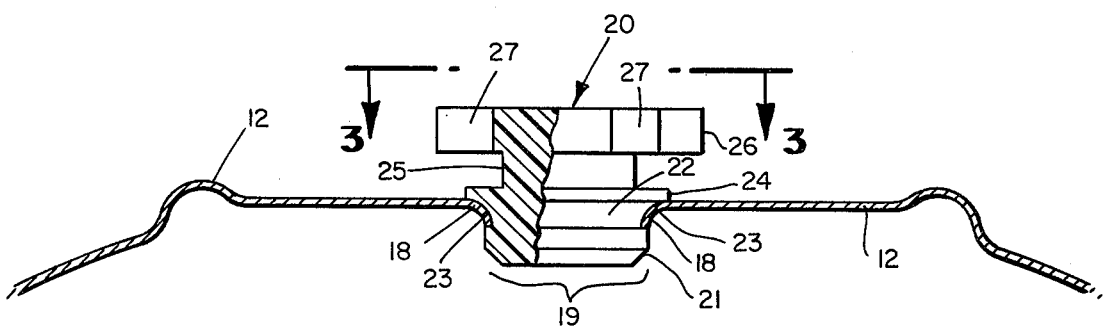
Fig. 2
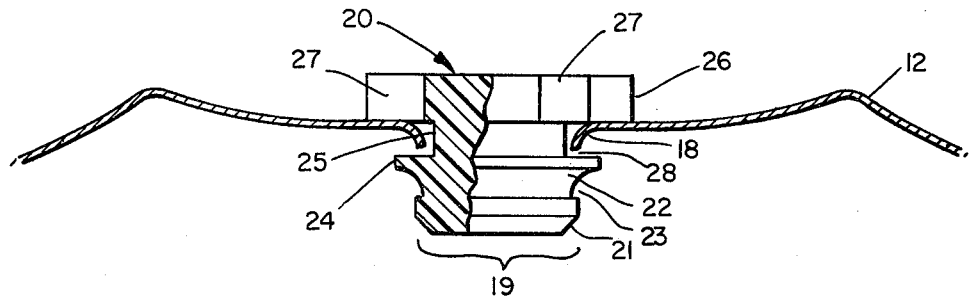
Fig. 4

PLUG RELIEF VALVE FOR PRESSURE CONTAINERS

BACKGROUND OF THE INVENTION

1. Field of the Invention

Pressure containers such as aerosol containers are potentially dangerous, because of the characteristic expansion of the internal propellent with increases in temperature. Excessive temperature can quickly generate dangerously high pressure levels within the container. In order to prevent container explosions which may cause human injury, as well as damage to other merchandise, it is necessary to provide a relief valve to insure the safe release of any pressure build-up within such a container.

2. The Prior Art

U.S. Pat. No. 3,245,578 — Sutton discloses a safety or pressure relief valve for a container bottom which has a rod with integral heads at each end inserted in an aperture with annular members used to create a tight fit in the aperture. One of the annular members is fabricated from a fusible material which will soften and yield to the internal pressure of the container so as to be blown clear when the temperature and pressure reach a predetermined level.

The fabrication costs of a relief valve of this type make it impractical for commercial use. Not only are three or four components involved, but also the need to use a material such as a low melting point metal alloy for the seal makes the use of this type of device commercially unfeasible.

U.S. Pat. No. 3,405,838 — Preisendanz discloses a one-piece plug that overcomes some of the objections to the Sutton type of device. A valve is used which has a projecting portion that fits into an aperture in the concave bottom of a pressure container. When excess pressure causes the concave bottom to pop outwardly, the popping causes the plug projection portion of the body to be pulled inward from the aperture, thus allowing the fluid to vent out through the aperture. Disadvantages associated with this type of safety device are that it may be set off by external pressure on the outer portion of the plug projection part of the valve and in some circumstances, depending on the position of the can, after the concave bottom is forced outwardly, the fluid will not escape at a controlled rate, but rather will gush out uncontrollably.

U.S. Pat. No. 3,029,981 — Webster et al. and U.S. Pat. No. 1,951,926 — Davidson disclose spring-biased safety relief valve devices. Valve members moving through housings are used to seal off an opening in the container. When excess pressure builds up and the spring resistance is overcome, the closure member is forced open allowing fluid to pass through. The cost of constructing the housings for the valve members makes this type of device commercially unfeasible.

U.S. Pat. No. 3,155,292 — Webster discloses a safety valve in which a valve member is seated against a gasket surrounding an opening by a spring which is contained in a spring retainer. Excess pressure within the container tends to lift the valve. However, the valve member includes no orifice providing an adequate but controlled rate of fluid escape. Webster also discloses a blow-out valve plug, but this plug also fails to provide for fluid escape at a controlled rate.

Manually operated valve systems for devices with controllable venting such as used in the refillable pressurized container disclosed in U.S. Pat. No. 3,363,810 — Meshberg are too cumbersome and too expensive for use in disposable containers, since they require a special sealing member and washer.

SUMMARY OF THE INVENTION

The present invention relates to a plug type safety release valve which eliminates the disadvantages stated above.

Accordingly, it is an object of this invention to provide a pressure relief valve which will permit the release of pressure from the container at a controlled rate.

It is another object of this invention to provide a pressure relief valve of the plug type in which the plug itself forms a seal with the container exterior.

It is still another object of this invention to provide a pressure relief valve of the plug variety which cannot easily be forced into the can by exterior pressure.

It is still a further object of this invention to provide a relief valve of relatively simple structure, so as to minimize cost.

In a preferred embodiment of the invention, a pressurized container comprises a head portion, a body side wall portion and a bottom. The head portion includes a dispensing valve member for releasing the container contents as desired and a bottom portion having safety release means for the release of container contents upon abnormal pressure build up. The safety release means is formed in part from the container bottom which has a concave peripheral surface and an integral relatively flat surface such that the central surface is disposed to deform outwardly responsive to an abnormal pressure build up in the container while the peripheral surface remains substantially concave. Valve means are located on the central surface and released upon deformation of the central surface to vent the container contents at a controlled rate to avoid potential danger from the abnormal pressure build up.

In a particularly preferred embodiment of the invention, the central surface includes an opening and the valve means comprises an axially extending plug inserted through the opening. The plug includes a radially outwardly extending locking portion and a radially outwardly extending sealing portion with the portion of the container bottom adjacent the opening extending radially inwardly between the sealing portion and the locking portion. A retaining portion of the plug axially spaced from and extending radially outwardly beyond the sealing portion in at least one radial direction retains the plug within the opening when the plug is moved axially in response to an axial venting force applied to the retaining portion of the plug.

The container bottom in the preferred embodiment of the invention comprises a lip around the opening forming an axially extending and radially inwardly tapering wall engaged by the locking portion at one end thereof. The sealing portion may also comprise an axially extending and radially inwardly tapering surface substantially conforming with the wall of the lip.

BRIEF DESCRIPTION OF THE DRAWINGS

FIG. 1 is a partial sectional side view of and Aerosol container with a force-fitted plug in its bottom;

FIG. 2 is an enlarged sectional view of the plug and container bottom of FIG. 1;

FIG. 3 is a plan view of the plug taken along line 3—3;

FIG. 4 is identical to FIG. 2 except the plug is shown in its venting position;

BRIEF DESCRIPTION OF THE PREFERRED EMBODIMENT

Figure 7:
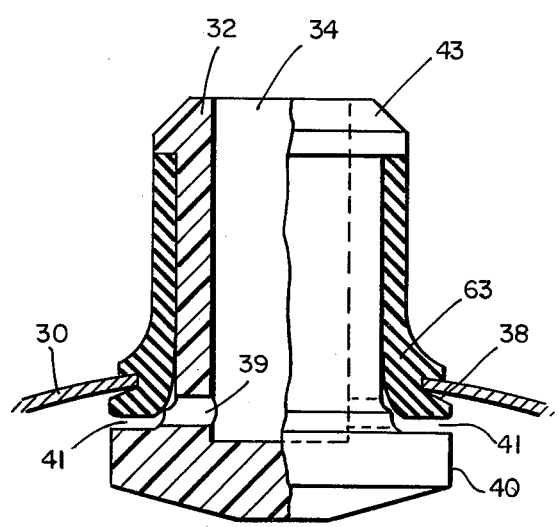
FIG. 7 is identical to FIG. 5 except the plug is shown in its venting position.

Turning to FIG. 1, a sheet-metal pressure container in the form of an Aerosol can 10 is shown as illustrative of the type of container for which the plug disclosed in this invention may be used. The can 10 comprises a sidewall portion 11, an end or bottom 12 seamed to the sidewall portion 11, and a head portion 13 into which a valve cup 14 is fitted. The valve cup 22 receives a valve member 15 which terminates with a nozzle 16 adapted to be pushed by a finger at its upper surface 17 as shown.

Referring to FIG. 2, a curved lip 18 of an opening 19 in the bottom 12 projects outwardly and downwardly. A plug 20 is inserted into the opening 19. The plug 20 includes the following portions: an exterior portion 21 that is of greater diameter than the opening 19 from one side of the lip 18 to the other; a tapered portion 22 having side 23 that conforms to the tapered lip 18 of the container bottom 12; a first interior portion 24 that is of larger diameter than the opening 19; and a secong interior portion 25 which is a neck or recessed portion of small diameter than the opening of said container; and a third portion 26 that is of greater diameter than the opening and is thicker than the first interior portion 24. Note that exterior portion 21 forms an external seal with the edge of the lip 18 while the portion 22 forms an internal seal with lip 18 of the can bottom 12. The interior portion 26 has channels 27 for a purpose hereinafter described.

When an abnormally high pressure build-up in the container occurs, the plug is forced outwardly through the opening 19 aided by the deformation of a portion of the can bottom 12 discussed below, when the resistance offered by interior portion 24 on the can bottom 12, and to a lesser extent the resistance of the tapered portion 22 which engages the lip 18, is overcome. As the plug moves longitudinally and slides out along the lip 18 of the container, the interior portion 24 is compressed and forced inwardly until it clears the radial portion of the lip 18 and the seal is broken. When this occurs, the neck or recessed portion 25 will be coextensive with the lip 18 of the container as seen in FIG. 4. Alternatively, the tapered portion 22 may be so designed that only it acts as a resistance member and the need for portion 24 is eliminated.

As the pressure build-up becomes critical the container bottom 12 will be forced to a relatively flat central portion of slightly convex position thus reducing the snugness of the plug fit and aiding in the release of the plug 20. In FIG. 2, the container bottom is shown under normal pressure and in FIG. 4, it is shown under abnormal pressure with the central portion convey outwardly and the plug in venting position.

It has been found desirable to design the container bottom 12, with regard to thickness and temper, so that the central flat portion will deform to a slightly convex position when the pressure build-up reaches a range of 170 210 to 21 psi. The plug may be made of rubber or of a suitable plastic which exhibits sufficient elasticity to form an adequate seal yet which permits sufficient compression to allow venting in the 170 to 210 psi range, aided by the container bottom deformation.

With the combination plug 20 and container bottom 12 design three alternative situations may occur: First, the pressure build-up may cause the deforming of the container bottom 12 and pushing out of the plug 20 to occur simultaneously; second, the deforming of the container bottom 12 may occur first followed by the pushing out of the plug 12; or, third, the plug 20 may be pushed out to its venting position by the pressure build-up alone without the container bottom 12 deforming. It is to be understood that the above three alternative pressure release possibilities are all contemplated as part of the invention and offer added assurance that the release valve will function in at least one manner.

While interior portion 26 prevents the plug from being forced completely through the opening, end portion 24 prevents the plug from moving back into the container, since it is of larger diameter than the opening 19 and no longer is aided by the tapered surface 23 and curved lip 18 as was the case when it was forced out. There is, nevertheless, some freedom of motion, since the neck portion 25 has a greater vertical measurement than does the lip 18 of the can bottom. This allows the container contents to escape by flowing through channel-like orifices 27 in the head portion 26, along the neck portion 25 and out in space 28 between the edge of the lip 28 and the top of the portion 24.

Once the plug 20 has been forced into the venting position (FIG. 4), fluid may escape at a controlled rate only, since the plug has not been blown clear of the opening 19. As stated above, the plug may be made of rubber or of a suitable plastic. Neoprene is an example of a rubber composition that may be used while Teflon, polypropylene and polyethylene are examples of plastics.

Figure 5:
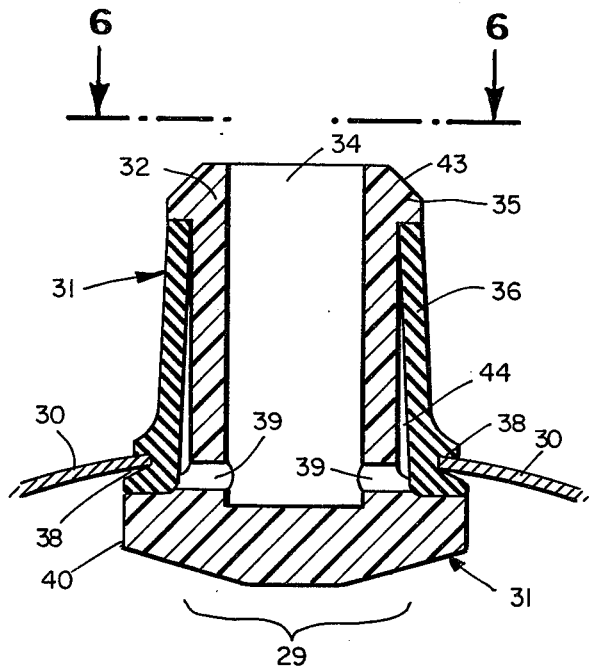
FIG. 5 is an enlarged sectional view of a spring-biased plug as inserted in the bottom of an aerosol container.
Figure 6:
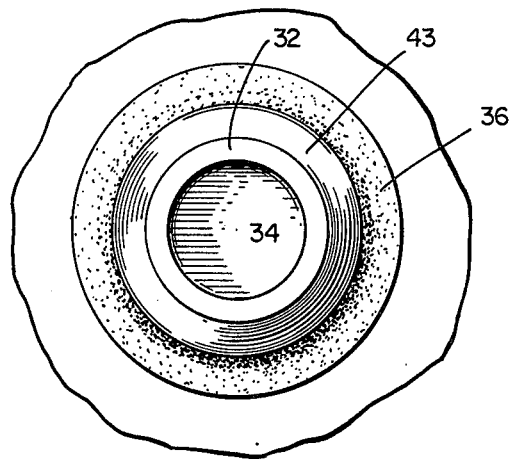
FIG. 6 is a plan view of the plug of FIG. 5 taken along line 6—6.

Referring to FIG. 5, a second embodiment of the safety plug is shown. The plug 31 in this embodiment is adapted to be inserted in an opening 29 in a bottom 30 or other wall of a pressure container. The plug 31 has an annular drum-like member 32 that extends inside of the can. A central bore 34 extends downwardly through the extended plane of the bottom of the can. A shoulder portion 35 of annular member 32 bears upon a rubber spring and seal member 36 having a groove 38 to receive the can bottom 30. Note that the spring and seal member 36 forms both an interior and exterior seal on the can bottom 30, thus insuring a leakproof connection without the necessity of any components or devices other than the plug itself. A transverse orifice 39 communicates with the central bore 34. An exterior sealing portion 40 of the plug is rigidly joined to the remainder of the annular member 32 and forms the bottom of the central bore 34. FIG. 6 shows the top view of the plug 31.

As pressure increases within the can, the force will cause member 32 to bear upon the spring 36 both compressing it longitudinally and causing it to give laterally. As member 32 overcomes the resistance of the spring 36, the seal between the sealing portion 40 and the resistance means 36 is broken and, the transverse orifice 39 will be pushed down to a point where the contents of the liquid may escape through an opening 41 created between spring 36 and base 40 as shown in FIG. 7. The diagonal side 43 of member 32 facilitates assembly of the device. Between the annular member 32 and the spring 36, a space 44 accommodates the lateral give of the spring as the pressure increases with the container.

As can be seen, once sufficient pressure has been released through the transverse orifice and the opening created between member 40 and the spring 36, the pressure on the spring will be reduced allowing the orifice to return to its normal position and causing the opening 41 between members 36 and 40 to close.

Figure 8:
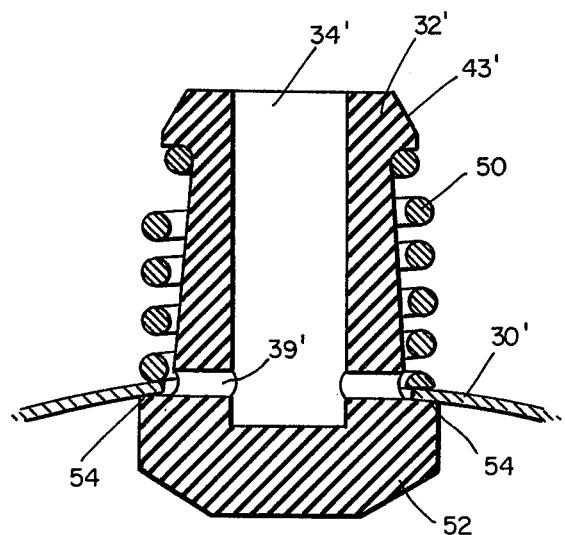
FIG. 8 is an enlarged sectional view of a plug modified slightly from the plug shown in FIG. 5.

Referring to FIG. 8, another embodiment of the spring-biased type plug is disclosed. Similar functioning members are indicated by a "'" designation. In place of the rubber spring 36, as shown in FIG. 5, a coil spring 50 is used. While generally this embodiment functions in the same manner as the earlier disclosed spring device, there are several structural and operational differences. Whereas in FIG. 5 the spring member extends below the can bottom 30 and forms both interior and exterior seals in FIG. 8, a rubber or plastic portion 52 forms an exterior seal only with bottom 30' but is otherwise similar to the exterior portion 40 of FIG. 5 in its relationship to the central bore 34' and the transverse orifice 39'.

The need for the space 44 in FIG. 5 to accommodate the lateral give of the spring member 36 is eliminated since spring member 50 compresses vertically only. The function of diagonal surface 43' remains the same.

The member 32' is pushed downwardly as the bias of the spring 50 is overcome. This causes the transverse orifice 39' to be pushed to a point below the can body where an opening (not shown) is created between the can bottom 30' and the exterior portion 52 of the plug thereby breaking the seal 54. In other words, the sealing relationship between the exterior portion 52 and the can bottom 30' is disturbed allowing the contents to escape from orifice 39'.

It is believed that the invention and many of its advantages will be understood from the foregoing description, and it will be apparent that various changes may be made without departing from the spirit and scope of the invention.

What is claimed is:

1. A method of releasing abnormally high pressure levels from within a container in which a plug means is utilized within a container opening comprising the steps of:

applying abnormally high pressure to an interior portion of said plug means;

transmitting said abnormally high pressure to a resistance portion of said plug means sealingly engaging said container;

driving the resistance portion of said plug means outwardly of said container causing resistance to be overcome;

permanently deforming a portion of the container by internal pressure transmitted directly from the contents to assist in driving the resistance portion of said plug from its initial position;

retaining the interior portion of said plug within said container; and preventing the uncontrolled escape of said container contents by means of the retention of said interior portion within said container.

2. In a pressurized container having a head portion, a body sidewall portion and a bottom, said head portion having a dispensing valve member for releasing the container contents as desired, and said bottom portion having safety release means for the release of container contents upon abnormal pressure buildup comprising in combination:

the container bottom including a concave peripheral surface, and integral therewith, a relatively flat central surface, said central surface being disposed to deform outwardly responsive to the abnormal pressure buildup within said container while said peripheral surface remains substantially concave; and valve means spaced from said peripheral surface and located within said central surface for opening upon deformation of said central surface to vent the container contents at a controlled rate to avoid potential danger from said abnormal pressure buildup.

3. The pressurized container of claim 2 wherein said container bottom has an opening therein surrounded by said central surface and said valve means comprises a plug received by said opening including a radially outwardly extending locking portion;

a radially outwardly extending sealing portion axially spaced from said locking portion, said bottom adjacent said opening extending radially inwardly between said sealing portion and said locking portion so as to simultaneously engage said sealing portion and said locking portion thereby restricting any axial movement of said plug, said sealing portion sealingly engaging said bottom and closing said opening so as to prevent the flow of gases through said opening, and an interior retaining means extending radially outwardly for retaining said plug in said opening when said sealing portion is forced outwardly of the container bottom upon deformation of said flat central surface.

4. The container of claim 3 wherein said container bottom includes a lip around said opening extending axially outwardly and radially inwardly from said central surface, said lip being engaged by said locking portion.

5. The container of claim 4 wherein said sealing portion comprises an axially extending and radially inwardly tapering surface substantially conforming with the configuration of said lip.

6. A container venting combination comprising:

a container wall having an opening therein;

an axially extending plug received by said opening including a radially outwardly extending locking portion;

a radially outwardly extending sealing portion axially spaced from said locking portion, said wall adjacent said opening extending radially inwardly between said sealing portion and said locking portion so as to simultaneously engage said sealing portion and said locking portion thereby resisting any axial movement of said plug, said sealing portion sealingly engaging said wall and closing said openings so as to prevent the flow of gases through said opening, and a radially outwardly extending retaining means axially spaced from said sealing portion for contacting said wall adjacent said opening when said plug is moved to a venting position such that the wall adjacent said opening extends between said sealing portion and said retaining portion.

7. The container venting combination of claim 6 wherein said container wall includes an axially extending and radially inwardly tapering lip around said opening engaged by said locking portion.

8. The container of claim 7 wherein said sealing portion comprises an axially extending radially inwardly tapering surface substantially conforming with the configuration of said lip.

* * * * *